(12) United States Patent
Kumar (10) Patent No.: US 10,311,110 B2
(45) Date of Patent: Jun. 4, 2019

(54) SEMANTICS FOR DOCUMENT-ORIENTED DATABASES

(71) Applicant: SAP SE, Walldorf (DE)

(72) Inventor: Hemant Kumar, Bangalore (IN)

(73) Assignee: SAP SE, Walldorf (DE)

( * ) Notice: Subject to any disclaimer, the term of this patent is extended or adjusted under 35 U.S.C. 154(b) by 515 days.

(21) Appl. No.: 14/980,325

(22) Filed: Dec. 28, 2015

(65) Prior Publication Data

US 2017/0185593 A1 Jun. 29, 2017

(51) Int. Cl.
| | | |
|---|---|---|
| G06F 7/02 | (2006.01) |
| G06F 16/00 | (2019.01) |
| G06F 16/93 | (2019.01) |
| G06F 16/31 | (2019.01) |
| G06F 16/22 | (2019.01) |
| G06F 16/25 | (2019.01) |

(52) U.S. Cl.
CPC .......... *G06F 16/93* (2019.01); *G06F 16/2228* (2019.01); *G06F 16/254* (2019.01); *G06F 16/322* (2019.01)

(58) Field of Classification Search
CPC ......... G06F 17/30563; G06F 17/30321; G06F 17/30011; G06F 17/2785; G06F 17/30625; G06F 16/254; G06F 16/2228; G06F 16/93; G06F 16/322
See application file for complete search history.

(56) References Cited

U.S. PATENT DOCUMENTS

| | | | | |
|---|---|---|---|---|
| 8,010,577 | B1 * | 8/2011 | Tibbett | G06Q 10/10 707/804 |
| 8,086,959 | B2 * | 12/2011 | Rothschiller | G06F 17/30914 707/E17.124 |
| 2006/0129745 | A1 * | 6/2006 | Thiel | G06F 17/30067 711/100 |
| 2011/0087670 | A1 * | 4/2011 | Jorstad | G06F 17/277 707/741 |
| 2015/0186478 | A1 * | 7/2015 | Yan | G06F 16/14 707/722 |
| 2016/0364377 | A1 * | 12/2016 | Krishnamurthy | G06F 17/271 |

OTHER PUBLICATIONS

"Managing Unstructured Data with Structured Legacy Systems," Maluf, David A. et al, IEEE, 2008. (Year: 2008).*

* cited by examiner

*Primary Examiner* — Bruce M Moser
(74) *Attorney, Agent, or Firm* — Buckley, Maschoff & Talwalkar LLC (57) ABSTRACT

A system and a method, the method including receiving a set of documents, the set including at least one instance of an unstructured document; parsing the set of documents to obtain information regarding the set of documents; determining a map of a map for the set of documents based on the information obtained by the parsing; generating a hierarchical semantic representation of the set of documents based on the map of the map; and storing the hierarchical semantic representation of the set of documents.

19 Claims, 11 Drawing Sheets

FIG. 1

```
{
    "firstName": "John",
    "lastName": "Smith",
    "isAlive": true,
    "age": 25,
    "height_cm": 167.6,
    "address": {
      "streetAddress": "21 2nd Street",
      "city": "New York",
      "state": "NY",
      "postalCode": "10021-3100"
    },
    "phoneNumbers": [
      {
        "type": "home",
        "number": "212 555-1234"
      },
      {
        "type": "office",
        "number": "646 555-4567"
      }
    ],
    "children": [],
    "spouse": null
}
```

[{
    "firstName": "John",
    "lastName": "Smith",
    "isAlive": true,
    "age": 25,
    "height_cm": 167.6,
    "address": {
      "streetAddress": "21 2nd Street",
      "city": "New York",
      "state": "NY",
      "postalCode": "10021-3100"
    },
    "phoneNumbers": [
      {
        "type": "home",
        "number": "212 555-1234"
      },
      {
        "type": "office",
        "number": "646 555-4567"
      }
    ],
    "children": [],
    "spouse": null
}, {
    "user_name":"Joe",
    "contact":{
              "phone":["123-456-7890", 30404040],
              "email":"xyz@example.com"
    },
    "access":{
              "level":5,
              "group":"dev"
    }
}]
```

```
<"firstName", {
    "weight" : 1,
    "data_type_rank" : {    "STRING" : 1    },
    "isVisible" : true,
    "lov_reference" : null,
    "parent_key" : null
}>

<"lastName", {
    "weight" : 1,
    "data_type_rank" : {    "STRING" : 1    },
    "isVisible" : true,
    "lov_reference" : null,
    "parent_key" : null
}>

<"address", {
    "weight" : 1,
    "data_type_rank" : null,
    isVisible : true,
    "lov_reference" : null,
    "parent_key" : null
}>

<"{address}.{streetAddress}">, {
    "weight" : 1,
    "data_type_rank" : {    "STRING" : 1    },
    "isVisible" : true,
    "lov_reference" : null,
    "parent_key" : "address"
}>

<"phoneNumbers" , {
    "weight" : 1,
    "data_type_rank" : {"LOV" : 1},
    "isVisible" : true,
    "lov_reference" : null,
    "parent_key" : null
}>

<"{phoneNumber}.{type}" , {
    "weight" : 1,
    "data_type_rank" : {  "STRING" : 1 },
    "isVisible" : false,
    "lov_reference" : "phoneNumber",
    parent_key " : "forbidenObjects"
}>

<"{phoneNumber}.{number}" , {
    "weight" : 1,
    "data_type_rank" : {  "STRING" : 1 },
    "isVisible" : false,
    "lov_reference" : "phoneNumber",
    parent_key " : "forbidenObjects"
}>
```

*FIG. 9*

```
1000
{
    "phoneNumber" : {
        "data_type" : "LOV",
        "isVisible" : true,
        "classification" : "OBJECT",
        "LOV_REF" : ["{phoneNumber}.{type}", "{phoneNumber}.{number}"]
    },
    "firstName" : {
        "data_type" : "STRING",
        "isVisible" : true,
        "classification" : " OBJECT",
        "LOV_REF" : null
    },
    "address" : {
        "isVisible": true,
        "classification" : "CLASS",
        "LOV_REF" : null,
        "children" : {
            "streetAddress" : {},
            "city" : {},....
        }
    },
    "forbiddenObjects" : {
        "isVisible" : false,
        "classification" : "CLASS",
        "LOV_REF" : null,
        "children" : {
            "{phoneNumber}.{type}" : {
                "data_type" : "STRING",
                "isVisible" : false
                "classification" : "OBJECT"
            },
            "{phoneNumber}.{number}" : {
                "data_type" : "STRING",
                "isVisible" : false
                "classification" : "OBJECT"
            }
        }
    }
}
```

… FIG. 11 is an illustrative depiction of a system, in accordance with some embodiments herein.

SEMANTICS FOR DOCUMENT-ORIENTED DATABASES

BACKGROUND

Relational databases are known for the organization and storage of data. Relational databases are strongly typed during a database creation process and store repeated data in separate tables that are defined by a programmer. In a relational database (RDB) every instance of data has the same format as every other, and changing that format is generally difficult.

In contrast to relational databases, there are NoSQL (also referred to as "non SQL" or "non relational") databases. A NoSQL database can provide a mechanism for the storage and retrieval of data that is modeled in terms other than the tabular relations used in relational databases.

In some aspects, data structures used by a NoSQL database (e.g. key-value, graph, or document) may differ from those used by default in relational databases, making some operations faster in NoSQL and others faster in relational databases. The particular suitability of a given NoSQL database for a particular use or application can depend on the problem that is being solved by using the NoSQL database. In some instances, the data structures used by noSQL databases may be viewed as being more flexible than the data structures used in relational database tables.

NoSQL databases are increasingly used in "big data" and real-time web applications. In some embodiments, NoSQL systems are also sometimes called "Not only SQL" to emphasize that they may support SQL-like query languages.

One type of NoSQL database is a document-oriented database or document store that is designed for the storing, retrieving, and managing of document-oriented information. The document-oriented information is also known as semi-structured data. It is noted that document-oriented databases are one of the main categories of NoSQL databases and the term "document-oriented database" has grown with the use of the term NoSQL itself.

DETAILED DESCRIPTION

The following description is provided to enable any person in the art to make and use the described embodiments. Various modifications, however, will remain readily apparent to those skilled in the art.

Document-oriented databases are a subclass of a key-value store, which is itself another NoSQL database concept. However, the difference in these two different databases is in the manner in which the data is processed. In a key-value store, the data is considered to be inherently opaque to the database. In a document-oriented system, the database system actually relies on an internal structure of the document in order to extract metadata that a database engine uses for further processing and optimization. In some aspects, this feature of a document-oriented database may support or facilitate a more efficient and flexible processing of documents.

Document databases contrast strongly with a traditional relational database (ROB). Document-oriented databases derive their type information from the data itself, may store all related information together, and may allow every instance of data to be different from any other instance of the data. These aspects may facilitate, support, and cause document-oriented databases to be more flexible regarding accommodating changes and optional values, efficiently map into program objects, and, in some instances, reduce database size.

A central concept of a document-oriented store is the concept of a "document". As referred to herein, a document is a group or set of user-readable information of varying format(s). While each document-oriented database implementation differs on the details of this definition of a document, they may assume, in general, that documents encapsulate and encode data (or information) in some standard formats or encodings. Encodings of a document as used herein may include XML (Extensible Markup Language), YAML (YAML Ain't Markup Language), and JSON (JavaScript Object Notation), as well as binary forms like BSON (Binary JSON). In some aspects, documents are addressed in the database by a unique key indicative of the document.

Regarding JSON (JavaScript Object Notation) representation of documents herein, it is noted that JSON is an open standard format that uses human-readable text to transmit data objects consisting of key-value pairs. JSON is a language-independent data format. As such, code for parsing and generating JSON data is available in a large variety of different programming languages.

JSON generally ignores any whitespace around or between syntactic elements (i.e., values and punctuation, but not within a string value). However. JSON recognizes four specific whitespace characters: the space, horizontal tab, line feed, and carriage return. However, JSON does not provide or allow any sort of comment syntax.

Early versions of JSON (e.g., as specified by RFC 4627) required that a valid JSON "document" consist of only an object or an array type—though they could contain other types within them. However, this restriction was relaxed starting with RFC 7158 (Request For Comments 7158 published in 2013 by the Internet Engineering Task Force, IETF), so that a JSON document may now consist of any valid possible JSON typed value. Regarding possible JSON data-types, the basic valid JSON types herein can include a number, a string, a Boolean value, an object and a null value. As used and referred to herein, a JSON "number" data-type refers to a signed decimal number that may contain a fractional part and may use exponential E notation. JSON does not allow non-numbers like "NaN", nor does it make any distinction between integer and floating-point. A JSON "string" data-type refers to a sequence of zero or more Unicode characters. Strings are delimited with double-quotation marks and support a backslash escaping syntax. Also, a "Boolean" refers to either a "true" value or a "false" value. A JSON "array" data-type refers to an ordered list of zero or more values, each of which may be of any type. In some embodiments, arrays use square bracket notation (e.g., "[ ]") with elements being comma-separated. A JSON "object" data-type refers to an unordered associative array (name/value pairs). In some embodiments, objects are delimited with curly brackets (e.g., "{ }") and use commas to separate each pair, while within each pair the colon ':' character separates the key or name from its value, where all keys are strings and should be distinct from each other within that object. A JSON "null" data-type refers to an empty value, thus the use of the term "null".

In some aspects, a BSON is a binary representation of JSON with additional type information. In JSON represented documents, the value of a field can be any of the BSON data types, including other documents, arrays, and arrays of documents.

In accordance with some embodiments herein, a JSON/BSON data object (i.e., document) may not have any limitations or restrictions on usage of different data-types in key-value pairs of the data object. For example, for a particular JSON data object, one key-value pair can have value of a String data-type & another key-value pair can have value of another JSON data-type. In some embodiments, each element of a JSON array can be of different data-types.

Figure 1:
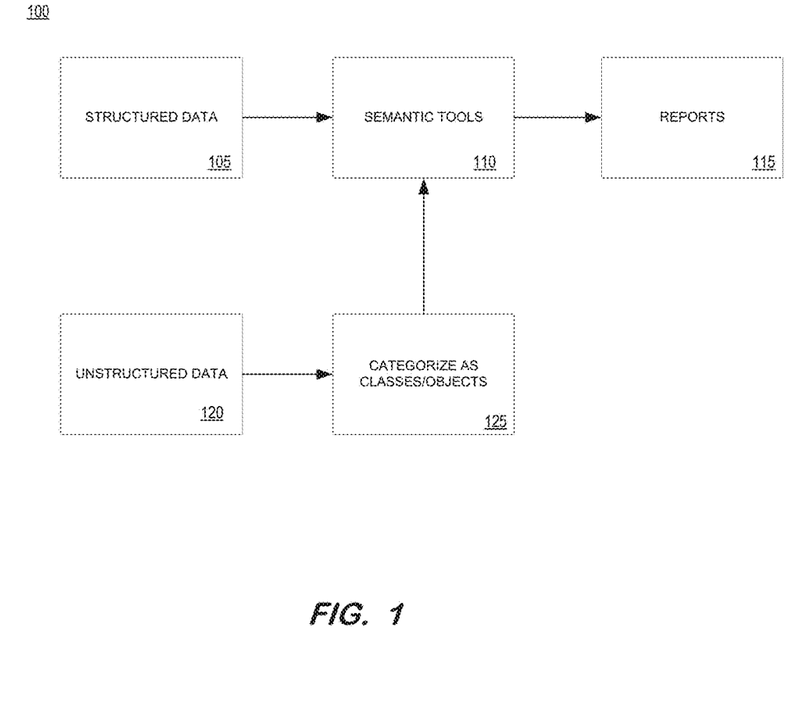
FIG. 1 is a system, in accordance with some embodiments herein.

Given the unrestricted and variety of different possible data-types for a JSON object, representing the non-structured or semi-structure metadata in a semantic layer of an application or service (e.g., SAP BusinessObjects Universes) presents a challenge. FIG. 1 is a logical schematic bock diagram of a system 100. System 100 includes structured data 105 and semantic tools 110 for processing of the structured data 105. Further shown in FIG. 1 is a collection or source of unstructured data 120. Unstructured data 120 may include JSON encoded documents. In accordance with some embodiments herein, unstructured data 120 may be processed or otherwise categorized into classes and objects to an extent that semantic tools 110 may process the unstructed data 120. In some respects, semantic tools 110 may include existing or legacy systems. Accordingly, FIG. 1 provides, at least in part, a system or platform to process unstructured data 120 using semantic tools 110 expecting well-defined, structured data 105. The processing by semantic tools 110 may operate to generate, for example, reports 115 resulting from one or more queries of the data (e.g., structured, semi-structured, and unstructured).

In some embodiments, a number of terms may be used in discussing features of the present disclosure. In particular, the following terms may be used throughout the following discussion. A "JSON data object" refers to a JSON Object and is indicated by content within curly brackets "{ }". A JSON data model refers to a JSON Array and may be indicated herein by content within square brackets "[ ]".

Figure 2:
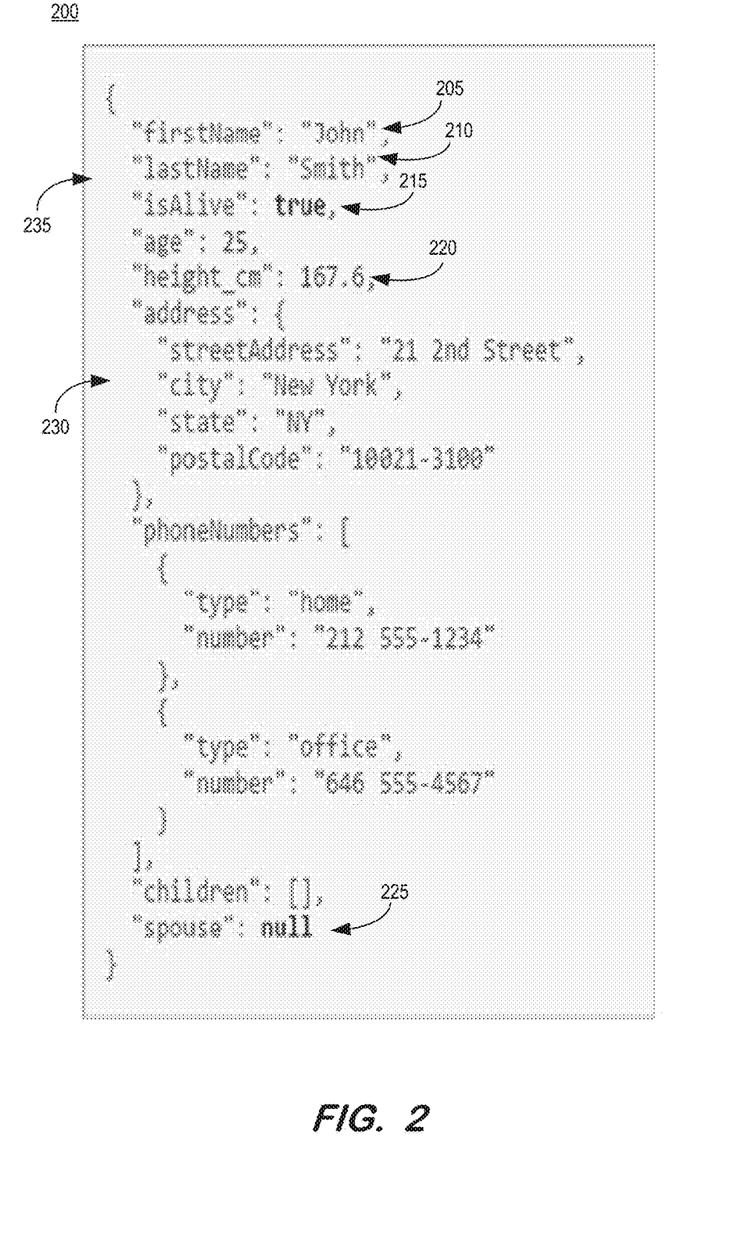
FIG. 2 is an illustrative example of a JSON data model, in accordance with some embodiments herein.
Figure 3:
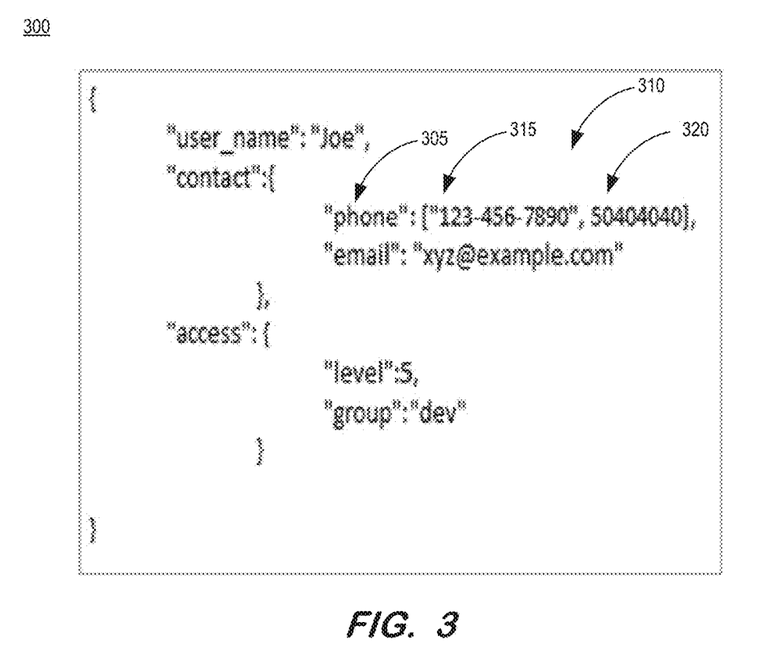
FIG. 3 is an illustrative example of a JSON data model, in accordance with some embodiments herein.

To illustrate some aspects herein, FIGS. 2 and 3 each illustrates a sample JSON data models having different schema. FIG. 2 is an illustrative depiction of an encoding of an embedded JSON data object 200 (e.g., persona 1) including usage of different data-types therein. JSON data model 200 shows a number of key-value pairs of different data-types supported by JSON (e.g., string, number, etc.). For example the values "John" at 205 and "Smith" at 210 are each strings data-types. The value "true" at 215 is a Boolean data-type, the value of "167.6" is a number data-type, at 225 there is an example of the "null" data-type.

FIG. 2 also shows an example of JSON data object embedded in another JSON data object. As shown, the JSON object "address" at 230 is embedded within another JSON object, namely the JSON object including the name John Smith starting at 235

Referring to FIG. 3, another example of an embedded JSON data model (e.g., persona 2) is shown. In the example of FIG. 3, the diversity and flexibility of the JSON data model is highlighted by the array of values associated with the key "phone" at 305. FIG. 3 illustrates, by example, how the phone number(s) of the depicted JSON data model can be represented in the form of an array 310 where the values 315, 320 within the array may comprise more than one data-type. As shown, the two element values of the array for the "phone" are of two different data-types including a string data-type at 315 and a number (i.e., integer) data-type at 320.

In some aspects, the size of a JSON data model can grow infinitely. For example, there is no limit on the number of key-value paired attributes within a JSON data object. The structure or schema of JSON data model can be very complex and thus difficult to understand by a human or other entity (e.g., application, program, etc.) depending on its size and usage of different embedded JSON objects. This aspect is highlighted by virtue of the unrestricted and possible different data-types for the JSON objects, as shown by the examples of FIGS. 2 and 3.

Figure 4:
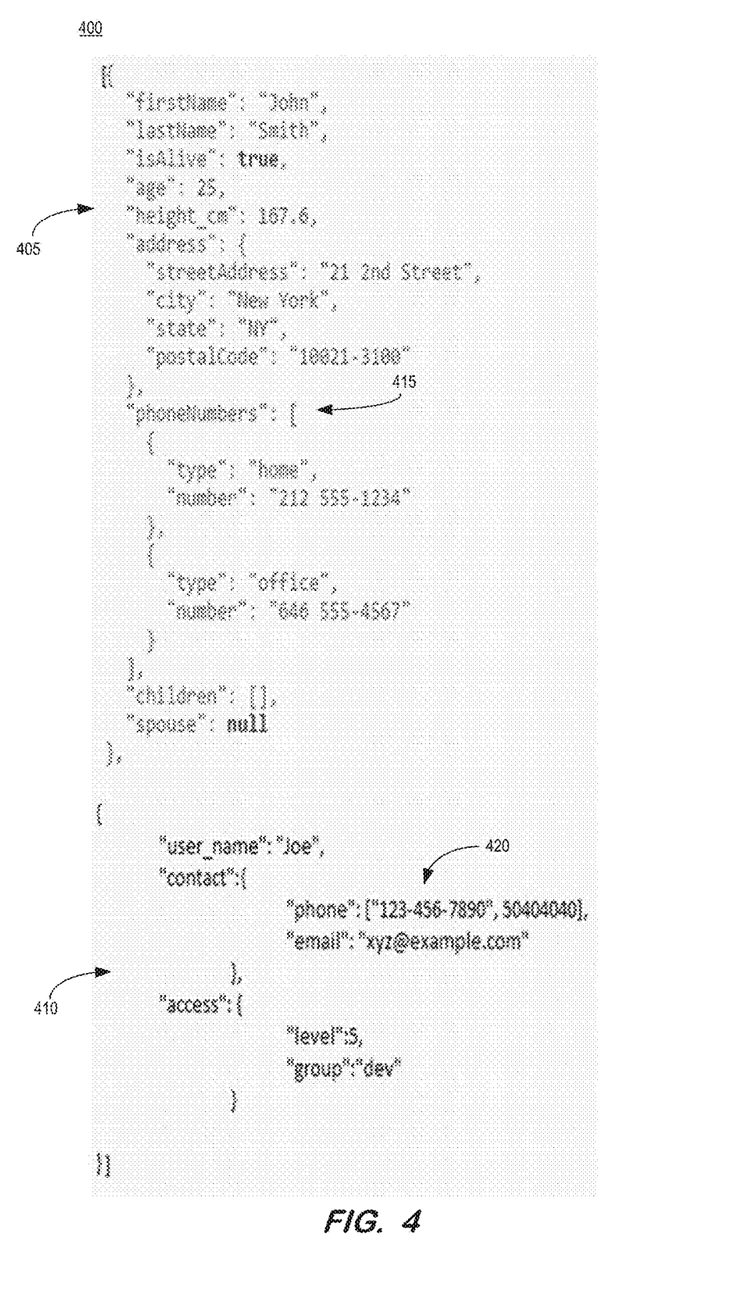
FIG. 4 is an illustrative example of a JSON data model including aspects of the data models of FIGS. 2 and 3, in accordance with some embodiments herein.

In some embodiments, the two JSON data objects introduced in FIGS. 2 and 3 may be combined into an array that results in a (more) complex JSON data model. The resulting array is presented in FIG. 4. The illustrative JSON data model 400 of FIG. 4 shows information of the two personas of FIGS. 2 and 3 that each have an entirely different set of attributes from the other. In this example, it may be challenging for a human or application (or other entity) to understand the schema representation of the two personas since they differ from each other and/or it is permissible make modifications in the attribute data-type or value as there is no predefined or set semantic(s) followed while defining these data objects or the model. As seen in FIG. 4, JSON data model 400 includes, inter alia, a JSON data object 405 and a JSON data 410, wherein the schema for the phone number in 405 and 410 differ from each other. For example, the array 415 has different data-types (i.e., two "string" data-types) than those in array 420 that includes a "string" data-type and a "number" data-type.

In some aspects, document-oriented data storage is increasingly popular and more entities are moving from traditional RDBMS systems to JSON/BSON systems based no-SQL systems. In some instances, a problem arises in the context of businesses and other entities having installed systems and products that are designed to work with RDBMS based data stores. In order to support different products, applications, services, and suites of products, the present disclosure relates to a component or mechanism that can represent this and other non-structured (i.e., semi-structured and unstructured) data in a managed hierarchical way. In one embodiment, a "Universe" created using the "Universe Design tool" (i.e., UDT) or "Information Design tool" (i.e., IDT) Business Objects by SAP.

The present disclosure provides a mechanism and process that can be used in a semantic layer of applications and other products (e.g., SAP Business Objects like Universe Designer Tool & Information Design Tool) to support document-oriented databases (e.g., Mongo DB, Apache Couch DB, etc.). In some embodiments, the hierarchical organization and representation of JSON objects (i.e., documents) and other unstructured or semi-structured data may be implemented without dramatically changing some aspects of the semantic layer behavior of the applications, products, and database systems. In some embodiments, the hierarchical representation of JSON objects/documents, as an example, in Class/Sub-class/Object categories provides a mechanism to represent the unstructured data in a manner that may be used by applications, products, services, and database systems to store, manage, and process the unstructured data, and in some embodiments automatically.

In some embodiments, the data-type of the JSON object/documents can vary without limit amongst the possible valid data-types. This aspect is discussed above and is further highlighted by the example JSON data models shown in FIGS. 1, 2, and 3. Classifying or describing the data-types of the unstructured data in the data object/documents can thus be a huge undertaking given the usage of numerous different data-types.

The present disclosure provides a process for accurately determining a data-type for JSON objects/documents that includes automatically detecting or determining the appropriate data-type based on, in some embodiments, sampling data to be stored and processed. In some embodiments, a sub-set of the data to be stored and managed by an application or service can be sampled using one or more sampling algorithms. The one or more sampling algorithms may operate to parse the sub-set of data (automatically) to determine the data-types of the documents to be stored and further processed.

The present disclosure includes a hierarchical representation of keys of JSON/BSON data structures as metadata representations of Universes. Values of a JSON object/document key can be different in various documents of a document-oriented database (e.g., MongoDB). In some embodiments, a sampling of the data to be stored may be done to detect and determine a best suited data-type for representing the values. This data-type identification will facilitate, for example, an accurate visualization of data in a reporting application or service relying on the JSON data.

In some embodiments, a method and system to implement the process(es) herein can provide semantics of a JSON data object or model in Class/Object hierarchy that may, for example, help or facilitate a human or any computer-executable program to identify the schema of a JSON data object. In some embodiments, an application, service, or database system (e.g. a SAP Application) can use the determined unstructured data (e.g., document(s)) for reporting purpose without a need to extensively change Reporting tools.

In some aspects, the present disclosure provides a mechanism to automatically determine an accurate and efficient process to organize and represent unstructured JSON (and other formatted information) in a hierarchical based manner (i.e., schema) such that the data may be used by, in some instances, products and systems (e.g., business reporting products) expected to process data from relational databases.

In some embodiments, for values of key-value pairs of JSON objects/documents represented as an array, a concept of "List of Values" (LOV) from, for example, SAP BusinessObject Semantic Layer tools (IDT & UDT) and/or other similar products (i.e., semantics tools) may be used. Also, a hidden class as illustrated by the FIG. 5 example semantic representation 500 of a document includes a section entitled "forbiddenObjects" 505 that can store the list of values for the array for the objects therein.

In some embodiments, the term "Class" with regard to the hierarchical representation of JSON data refers to a Name of a Collection of one or more documents/objects in a document-oriented database. In some embodiments, a "Sub-Class" refers to a key attribute of a JSON object having an embedded JSON as its value. (i.e., Document of MongoDB). In some embodiments, an "Object" refers to a key attribute of a JSON object without embedded JSON as its value. (i.e. Document of MongoDB).

Figure 5:
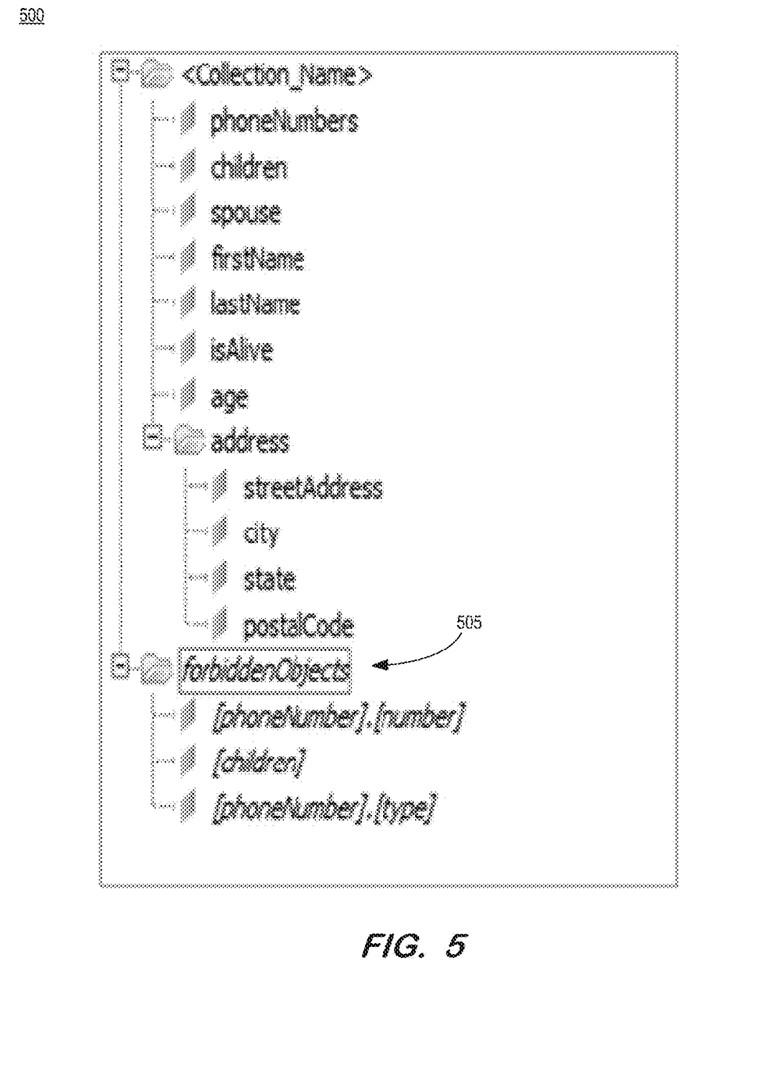
FIG. 5 is an illustrative depiction of a hierarchical semantic snippet of a document, in accordance with some embodiments herein.

FIG. 5 is a depiction of a normalized tabular structure of a JSON data model schema, according to some embodiments herein. In some embodiments, the example of FIG. 5 may be an illustrative example a hierarchical semantic representation for the JSON data model of FIG. 4.

The present disclosure further includes, in some embodiments, having one Universe Object created if a JSON Array is detected or otherwise determined to have a distinct key. For example, an element of different data type or the element is JSON data object of different schema and a corresponding Object for LOV mapping in the class "forbiddenObjects".

The present disclosure further includes, in some embodiments, generating or establishing one object for each distinct JSON data object. If the more than one collection is detected having same "key" it will consider it as one Universe Object, discarding others.

In some embodiments, while parsing each document of MongoDB (i.e. JSON Object), an internal map will be maintained for sampling to determine a most suitable data-type of the corresponding Universe Object.

Figure 6:
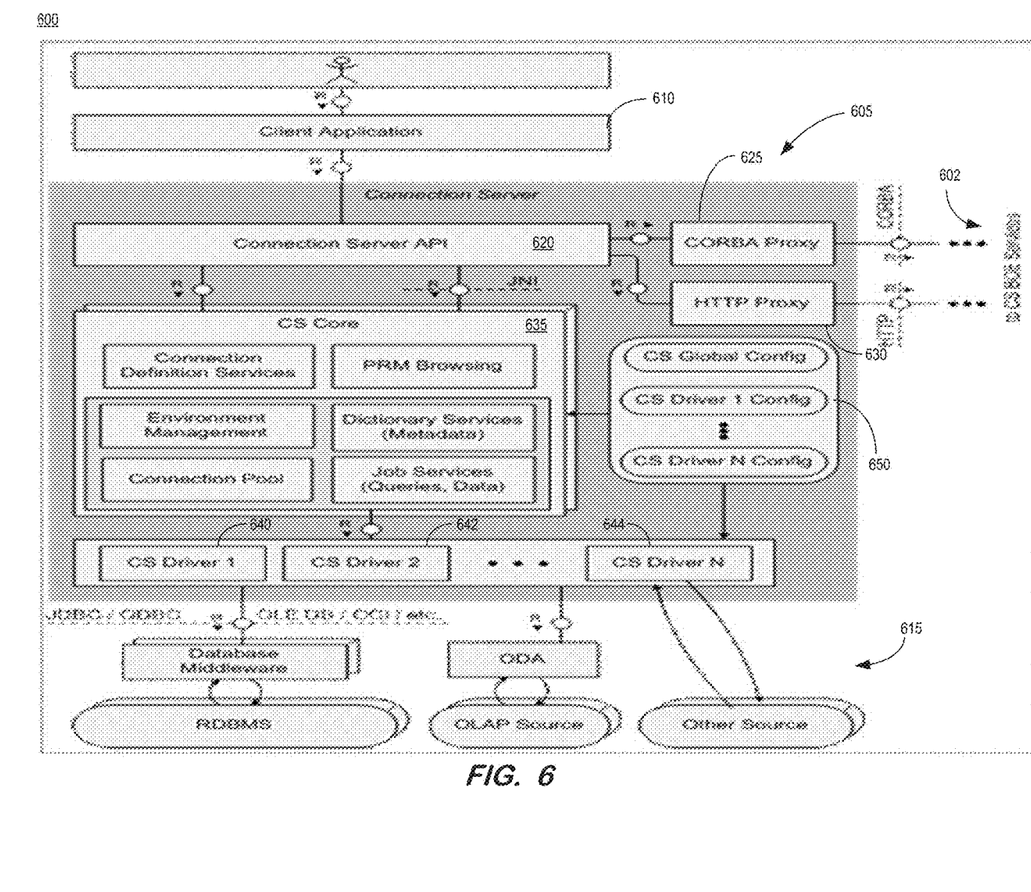
FIG. 6 is an illustrative depiction of a system and architecture 600.

FIG. 6 is an illustrative depiction of a system and architecture 600. System 600 includes a Connection Server (CS) 605, which is a SAP BusinessObjects data access software layer that manages the connection(s) between an application 610 and the datasource(s) 615 in the example of FIG. 6. Connection Server 605 may be part of or interface with other components and systems such as SAP BusinessObjects Enterprise (BOE) suite 602. CS 605 provides a mechanism for SAP BusinessObjects applications 610 such as, for example, a universe design tool (i.e., Designer) and SAP BusinessObjects Interactive Analysis (i.e.,. WebI), to connect to and run queries against datasource(s) 615.

Connection Server 605 does not typically have a user interface. In some aspects, connections can be created and managed from a user interface of applications 610 and/or by editing configuration files of the CS.

In some aspects, the way data is passed through Connection Server 605 may be optimized by modifying data access configuration files. These configuration files may be in XML format and can be installed with the Connection Server. Parameter values may be set to apply to a specific data access driver or to all installed data access drivers.

Some of the components or agents depicted in FIG. 6 will be described below, to provide a background for some embodiments of the present disclosure. However, embodiments of the present disclosure are not limited to the system and architecture depicted in FIG. 6. Accordingly, not every agent shown in FIG. 6 is discussed in detail or at all.

As an overview, CS API 620 is a uniform and multiplatform data source access protocol. It provides a facade above the available CS implementations and is responsible for dispatching incoming requests to the appropriate CS implementation, The different CS implementations can be selected at runtime, either automatically or explicitly.

COBRA proxy 625 is a client-side proxy responsible for delegating the CS API calls directly to a CS BOE Service. HTTP proxy 630 is client-side proxy responsible for delegating the CS API calls to a CS BOE Service using a custom HTTP-based protocol.

CS Core 635 is a logical component that provides the actual implementations (C++ and Java) of the CS API 620. The CS BOE services 602 are also implemented as wrappers around this CS Core main component.

CS Core 635 responds to requests from CS API 620 and relies on CS drivers 640, 644, and 646 to send commands and queries to the underlying data sources 615. CS drivers 640, 644, and 646 realize the interface between 635 CS Core and a data source 615. Usually, there is a CS Driver per access protocol (e.g., ODBC, OLE DB, OCI, etc.), and a data source specialization can be achieved by relying on the CS Driver Configuration files 650. The CS Configuration files control different behaviors of the CS drivers depending on the targeted middleware.

Figure 7:
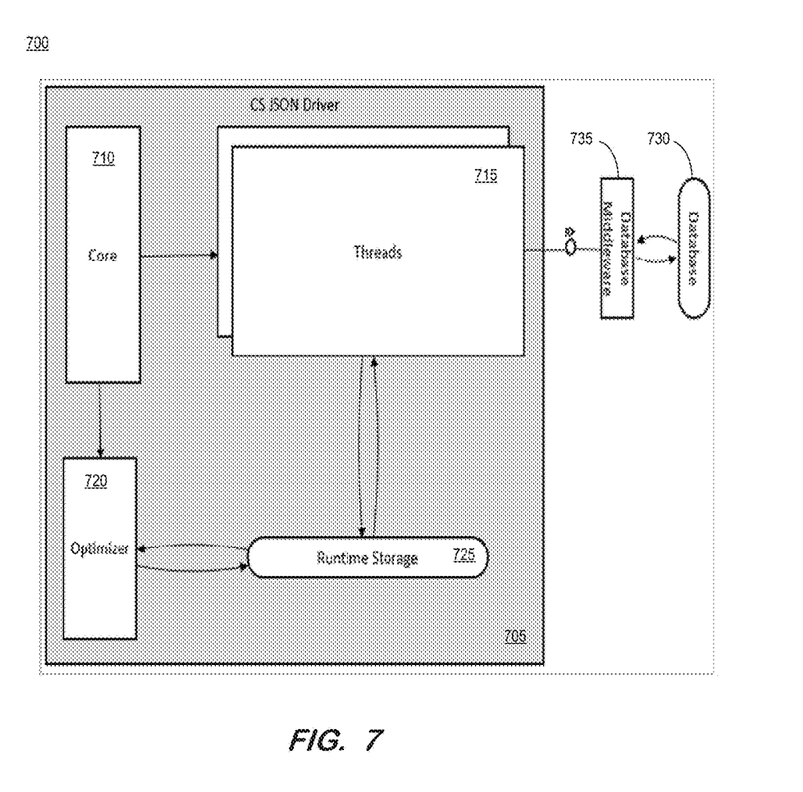
FIG. 7 is an illustrative depiction of a architecture for a system, in accordance with some embodiments herein.

In some aspects, there can be specialized CS Driver versions for supporting special middleware implementations. In some cases, a CS Driver depends on a database access API implementation. Database middleware 645 is the implementation of the database access protocol. In some cases, a CS Driver depends on such an implementation and requires the appropriate middleware to be installed and correctly configured at run-time In some embodiments herein, a CS JSON driver is disclosed that can operate to efficiently and accurately generate a semantic representation of a CS JSON Driver architecture. FIG. 7 is a schematic block diagram for a logical representation of a system 700, in accordance with some embodiments herein. Architecture 700 includes a CS JSON driver 705 that can make calls to a database 730 and receive data therefrom. In some embodiments, communication between the CS JSON driver 705 and database 730 may be facilitated and supported via database middleware 735.

Figure 10:
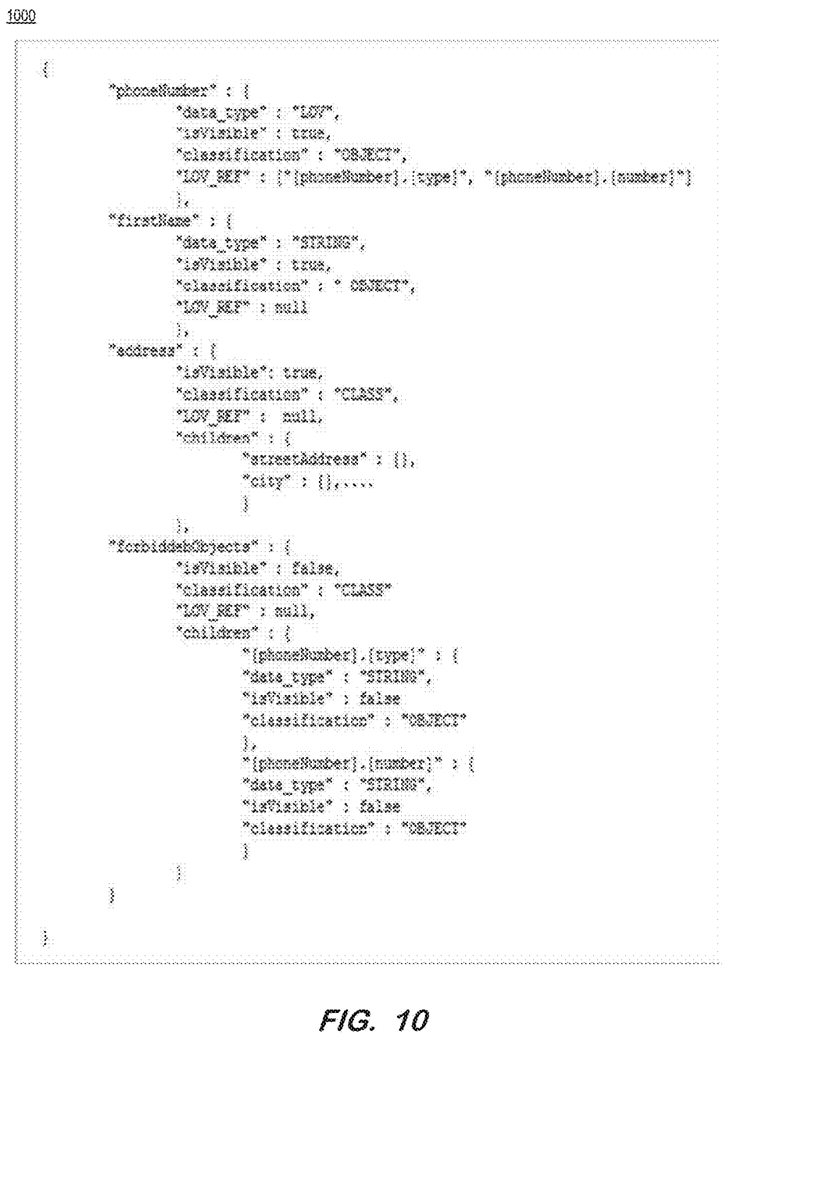
FIG. 10 is an illustrative depiction of dictionary information related to a hierarchical semantic snippet of a document, in accordance with some embodiments herein.

Regarding the different logical/functional components of CS JSON driver 705, the CS JSON driver may include a core 710, a plurality of execution Threads 715, an optimizer 720, and a runtime (RT) storage facility 725. Regarding Optimizer 720, the functionality thereof may include merging "semantics of the thread" and providing a semantic representation of the JSON based databases, as shown in FIG. 10.

In some aspects, Core 710 operates as a controller of CS JSON driver 705. The Core manages a number of Threads 715 and their execution. The number of Threads 715 to be created in a particular instance or implementation can be a configurable parameter. Threads 715 provide the interface to data source 730, per one or more access protocol(s) (e.g., Open Database Connectivity (ODBC), Java Database Connectivity (JDBC), etc.). This component depends on a database access API implementation.

Regarding Core 710, the functionality thereof may include a responsibility to establish and manage connection(s) with database(s), the creation and management of Thread(s)) 715 to get document(s) from the database(s)); and memory management for the "map of a map" (described in greater detail elsewhere herein).

Figure 8:
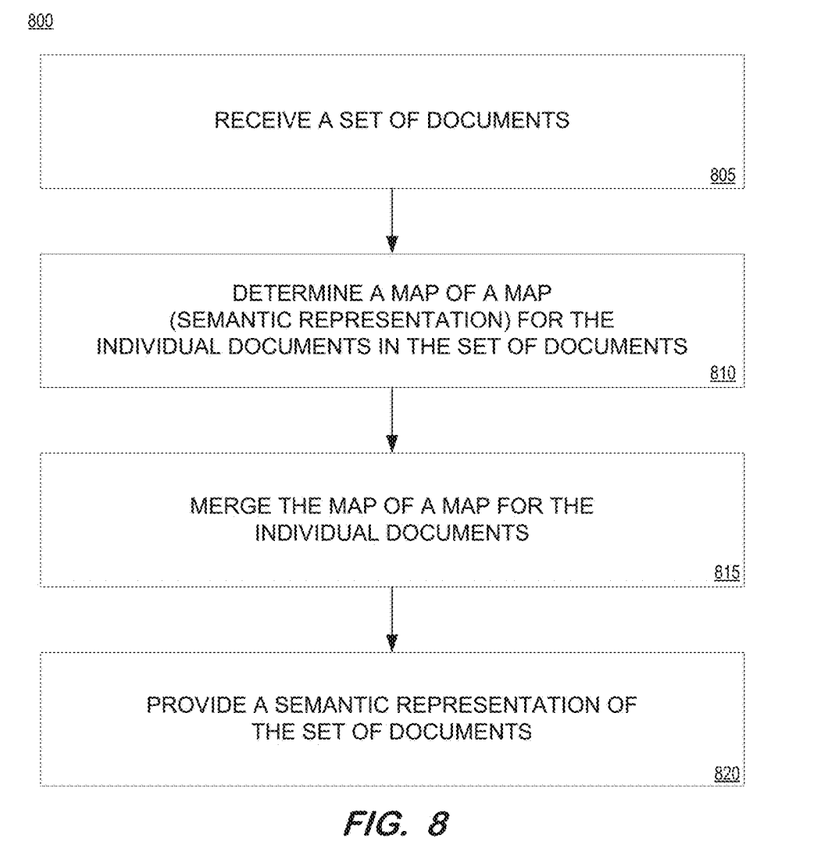
FIG. 8 is an illustrative flow diagram of a process, in accordance with some embodiments herein.

A CS driver herein may be controlled to effectuate a process such as the process(es) depicted in the flow diagram of FIG. 8 that relate to a JSON driver, in accordance with some embodiments herein. The flow diagram may, in some embodiments, be implemented by a system (e.g., FIG. 6) including the CS JSON Driver 705 illustrated in FIG. 7. At operation 805 of process 800, a core 710 (via a core agent) operates to manage one or more executable Threads 715 and their execution. In some embodiments, the number of Threads to be created can be established or set during a configuration of the system or be determined based on system resources, such as for example, an amount of memory. In some embodiments, JSON driver 705 may be controlled to implement process 800. For example, one or more Threads 715 may each be invoked to receive a set of JSON documents via database middleware 735 from database 730 for the semantic analysis of each document.

At operation 810, individual documents being processed by each of the threads are parsed and metadata information associated with the parsed documents may be stored in a run-time storage (e.g., FIG. 7, 725) as a "map of a map".

In accordance with some embodiments herein, a proposed structure of a "map of a map" can be:

```
<key,{ weight:<weight_of_occurance> ,   data_type_rank:{ <data_type>:<rank>,...},
       isVisible : <Boolean_value>,     lov_reference: <key_of_parent>,
       parent_key : <key_of_parent>     }>.
```

Figure 9:
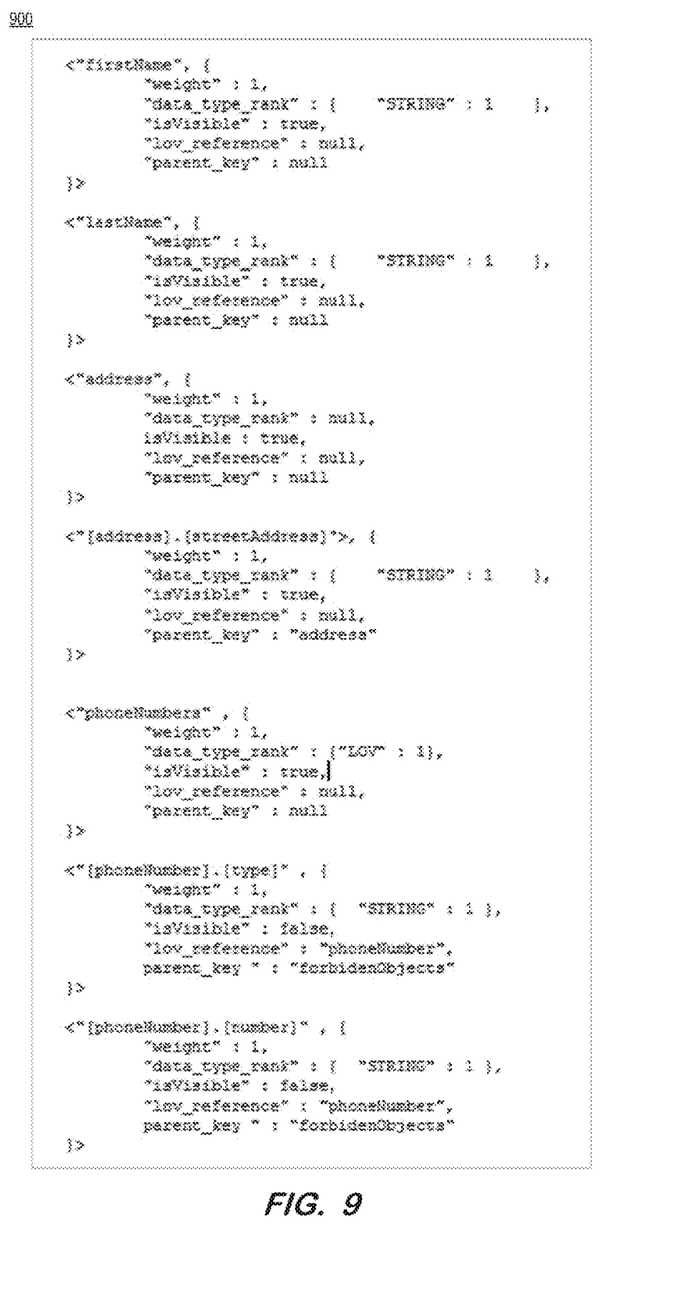
FIG. 9 is an illustrative depiction of a semantic representation of a document, in accordance with some embodiments herein.

This map of map is referred to as "semantic of individual document" in the discussion below. An illustrative depiction of a snippet of the "semantic of individual document" for "Persona sample JSON data model" shown in FIG. 2 is provided in FIG. 9. Following the structure for the map of a map outlined above, the semantic representation shown FIG. 9 is configured to have a value for a "weight", a "data type rank", an "isVisible", a "lov_refrence", and a "parent_key" parameters.

Regarding the "weight", a formula to calculate the weight and data_type_rank can generally be represented by 1/(number of documents picked by thread for analysis). Herein, the weights for the individual documents will be referred to as $W_{1...N}$ and the data rank type for the individual documents will be referenced as $DTR_{1...N}$.

At operation 815, each thread can operate (i.e., execute) to merge the "semantics of the individual document" to, inter alia, reduce the memory consumed by each thread. This merged data structure is referred as "semantics of the thread" herein below. The weight for the merged semantics of the thread and the data type ranks can be determined as follows:

a. Weight=$(W_1+W_2+ \ldots +W_N)$/(Total number of Threads)

b. Data Type Rank=$(DTR_1+DTR_2+ \ldots +DTR_N)$/(Total number of Threads).

Referring to FIG. 8, process 800 continues at operation 820 where an optimization is executed to further merge the "semantics of the thread" and provide a semantic representation for the JSON documents to the JSON (i.e., document-based) database(s).

FIG. 10 is an instance of a semantic representation that may, as an example, be provided to a CS consumer. FIG. 10 adheres to the structure defined in the "map of a map" determined at operation 810 of process 800 and shown in FIG. 9.

Figure 11:
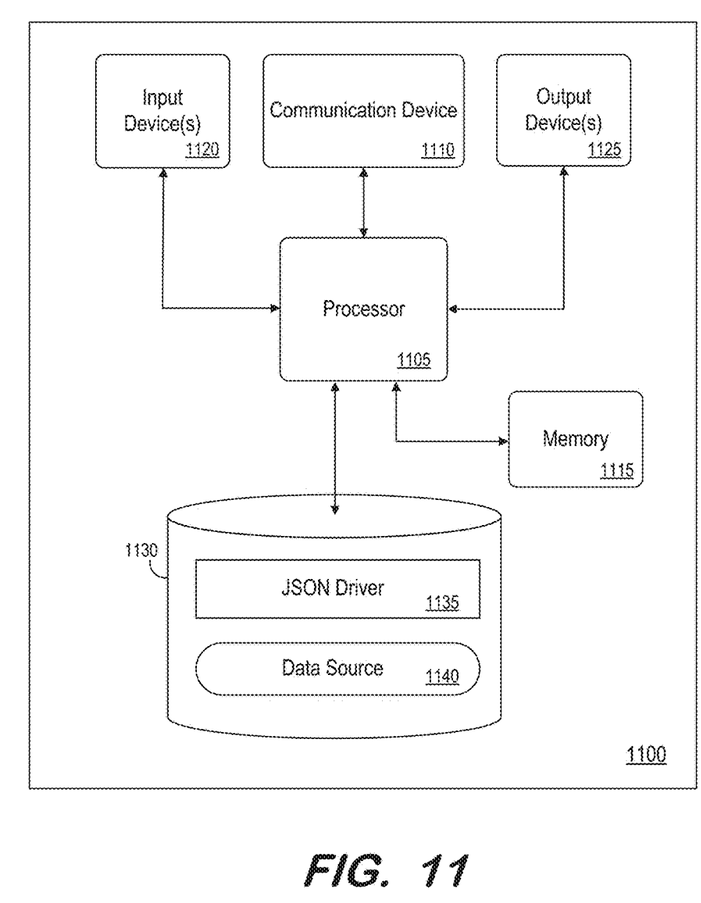

FIG. 11 is a block diagram of apparatus 1100 according to some embodiments. Apparatus 1100 may comprise a general-purpose computing apparatus and may execute program code or instructions to perform any of the processes described herein. Apparatus 1000 may comprise an implementation of query server, comprising an in-memory database. Apparatus 1100 may include other unshown elements according to some embodiments.

Apparatus 1000 includes processor 11005 operatively coupled to communication device 1010, data storage device 1130, one or more input devices 1020, one or more output devices 1025 and memory 1115. Communication device 1010 may facilitate communication with external devices, such as a client device or a data storage device. Input device(s) 1020 may comprise, for example, a keyboard, a keypad, a mouse or other pointing device, a microphone, knob or a switch, an infra-red (IR) port, a docking station, and/or a touch screen. Input device(s) 1120 may be used, for example, to enter information into apparatus 1100. Output device(s) 1125 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1115 may comprise Random Access Memory (RAM).

JSON driver 1135 may comprise program code or instructions executed by processor 1105 to cause apparatus 1100 to perform any one or more of the processes described herein. Embodiments are not limited to execution of these processes by a single apparatus. Data source 1140 may implement data source 105 as described above. As also described above, data source 1140 may be implemented in volatile memory. Data storage device 1130 may also store data and other program code for providing additional functionality and/or which are necessary for operation of apparatus 1100, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 and/or system 1100 may include a processor to execute program code such that the computing device operates as described herein.

All processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

The embodiments described herein are solely for the purpose of illustration. For example, some embodiments may include operation(s) to determine whether a determination of a cardinality estimate in accordance with the various embodiments disclosed herein should be modified and/or performed, at least in part. For example, if an estimate <theta/2, then the estimate may be assumed to be theta/2. This estimation will not overestimate the real value, although in some instances it may underestimate the real value. It has been observed that the maximum error (disregarding theta) is reduced drastically. In some aspects, in addition to the different bucket types, there are further special cases where histogram construction is not useful. Such cases may include, for example, columns with only unique values, when explicit frequencies per value consume less space than the histogram (e.g., when there are few distinct values in a column), etc. Those in the art will recognize other embodiments which may be practiced with modifications and alterations.

Aspects discussed hereinabove may be implemented through any tangible implementation of one or more of software, firmware, hardware, and combinations thereof.

Although embodiments have been described with respect to certain contexts, some embodiments may be associated with other types of devices, systems, and configurations, either in part or whole, without any loss of generality.

What is claimed is:

1. A method, the method comprising:
receiving a set of documents, the set including instances of unstructured or semi-structured documents, the unstructured or semi-structured documents being data encoded to include at least two different data-types;
parsing the set of documents to obtain metadata information regarding each of the documents in the set of documents;
automatically determining data-types for each document in the set of documents based on the metadata information regarding each of the documents in the set of documents obtained by the parsing;
generating a hierarchical semantic representation of the set of documents based on the determined data-types for each of the documents in the set of documents, the hierarchical semantic representation of the set of documents including a value for a merged weight and a merged data type rank that is calculated based on a weight and a data type rank calculated for each of the documents in the set of documents;
storing the hierarchical semantic representation of the set of documents; and
querying, by a semantic layer of an application that processes structured hierarchical data, the stored hierarchical semantic representation of the set of unstructured or semi-structured documents encoded to include the at least two data-types.

2. The method of claim 1, wherein the parsing of the set of documents includes parsing a subset of the set of documents.

3. The method of claim 1, wherein the parsing comprises parsing individual documents in the set of documents to obtain information regarding the individual documents in the set of documents.

4. The method of claim 3, further comprising:
   merging the determined data-types for the individual documents; and
   generating the hierarchical semantic representation for the set of documents based on the merged determined data-types for the individual documents.

5. The method of claim 1, wherein the information obtained by parsing the set of documents comprises key-value pairs and the values may be represented by a combination of at least one of a number, a string, a Boolean value, an array, an unordered associative array, and a null value without limit.

6. The method of claim 1, wherein the instances of the unstructured or semi-structured documents does not adhere to a predefined set of semantics.

7. The method of claim 1, wherein the instances of the unstructured or semi-structured documents is retrieved from a document-oriented database.

8. The method of claim 1, wherein the information obtained by parsing the set of documents corresponds to an internal structure of the unstructured or semi-structured documents, including at least a data-type for key-value pairs of each of the unstructured or semi-structured documents.

9. A non-transitory computer-readable medium having:
   instructions to receive a set of documents, the set including instances of an unstructured document or semi-structured documents, the unstructured or semi-structured documents being data encoded to include at least two different data-type;
   instructions to parse the set of documents to obtain metadata information regarding each of the documents in the set of documents;
   instructions to automatically determine data-types for each document in the set of documents based on the metadata information regarding each of the documents in the set of documents obtained by the parsing;
   instructions to generate a hierarchical semantic representation of the set of documents based on the determined data-types for each of the document in the set of documents, the hierarchical semantic representation of the set of documents including a value for a merged weight and a merged data type rank that is calculated based on a weight and a data type rank calculated for each of the documents in the set of documents;
   instructions to store the hierarchical semantic representation of the set of documents; and
   instructions to query, by a semantic layer of an application that processes structured hierarchical data, the stored hierarchical semantic representation of the set of unstructured or semi-structured documents encoded to include the at least two data-types.

10. The medium of claim 9, wherein the parsing of the set of documents includes parsing a subset of the set of documents.

11. The medium of claim 9, wherein the information obtained by parsing the set of documents is represented as metadata.

12. The medium of claim 9, wherein the parsing comprises parsing individual documents in the set of documents to obtain information regarding the individual documents in the set of documents.

13. The medium of claim 12, further comprising:
   instructions to merge the determined data-types for the individual documents; and
   instructions to generate the hierarchical semantic representation for the set of documents based on the merged determined data-types for the individual documents.

14. The medium of claim 9, wherein the information obtained by parsing the set of documents comprises key-value pairs and the values may be represented by a combination of at least one of a number, a string, a Boolean value, an array, an unordered associative array, and a null value without limit.

15. The medium of claim 9, wherein the instances of the unstructured or semi-structured documents does not adhere to a predefined set of semantics.

16. The medium of claim 9, wherein the instances of the unstructured or semi-structured documents is retrieved from a document-oriented database.

17. The medium of claim 9, wherein the information obtained by parsing the set of documents corresponds to an internal structure of the unstructured or semi-structured documents, including at least a data-type for key-value pairs of each of the unstructured or semi-structured documents.

18. A system comprising:
   a database; and
   a sever including a processor and a driver, the driver configured to make calls to the database and in cooperation with the processor to:
      receive a set of documents, the set including instances of unstructured or semi-structured documents, the unstructured or semi-structured documents being data encoded to include at least two different data-type;
      parse the set of documents to obtain metadata information regarding each of the documents in the set of documents;
      automatically determine data-types for each document in the set of documents based on the metadata information regarding each of the documents in the set of documents obtained by the parsing;
      generate a hierarchical semantic representation of the set of documents based on the determined data-types for each of the document in the set of documents, the hierarchical semantic representation of the set of documents including a value for a merged weight and a merged data type rank that is calculated based on a weight and a data type rank calculated for each of the documents in the set of documents;
      store the hierarchical semantic representation of the set of documents; and
      query, by a semantic layer of an application that processes structured hierarchical data the stored hierarchical semantic representation of the set of unstructured or semi-structured documents encoded to include the at least two data-types.

19. The system of claim 18, wherein the parsing of the set of documents includes parsing a subset of the set of documents.

* * * * *